United States Patent
Plache et al.

(10) Patent No.: US 8,943,013 B2
(45) Date of Patent: Jan. 27, 2015

(54) REAL-TIME EQUIPMENT BEHAVIOR SELECTION

(75) Inventors: Kenneth S. Plache, Scottsdale, AZ (US); Paul R. D'Mura, Glendale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1648 days.

(21) Appl. No.: 12/212,848

(22) Filed: Sep. 18, 2008

(65) Prior Publication Data
US 2010/0071057 A1 Mar. 18, 2010

(51) Int. Cl.
*G06N 5/00* (2006.01)
*G06F 1/00* (2006.01)
*G05B 19/045* (2006.01)
*H04L 29/06* (2006.01)

(52) U.S. Cl.
CPC .... *G05B 19/045* (2013.01); *G05B 2219/23289* (2013.01); *G05B 2219/24168* (2013.01); *H04L 63/102* (2013.01)
USPC .............................. 706/47; 370/392; 714/718

(58) Field of Classification Search
USPC ........................................................ 706/47
See application file for complete search history.

(56) References Cited

U.S. PATENT DOCUMENTS

| | | | |
|---|---|---|---|
| 6,268,853 B1 | 7/2001 | Hoskins et al. | |
| 6,854,111 B1 | 2/2005 | Havner et al. | |
| 7,149,792 B1 | 12/2006 | Hansen et al. | |
| 7,181,302 B2 | 2/2007 | Bayne | |
| 7,233,830 B1 | 6/2007 | Callaghan et al. | |
| 7,242,988 B1 | 7/2007 | Hoffberg et al. | |
| 7,266,677 B1 | 9/2007 | Bromley et al. | |
| 7,412,530 B1 | 8/2008 | Wehrle et al. | |
| 7,424,327 B2 | 9/2008 | Grgic et al. | |
| 7,424,329 B2 | 9/2008 | McKelvey et al. | |
| 2006/0253397 A1* | 11/2006 | Gomez et al. | 705/50 |
| 2007/0056030 A1* | 3/2007 | Kay | 726/11 |

* cited by examiner

*Primary Examiner* — Jeffrey A Gaffin
*Assistant Examiner* — Kalpana Bharadwaj
(74) *Attorney, Agent, or Firm* — Amin, Turocy & Watson, LLP

(57) ABSTRACT

At creation, a state machine of an industrial control configuration can be hard-coded with a number of states in a hierarchical manner. Once implemented into the configuration, it can be desirable for the states, interpretations of the states, and the like to be modified in accordance with particular desires and processes. Therefore, a user can select a change to a hierarchical rule set of the state machine while the state machine is part of the configuration and the change can be implemented.

20 Claims, 11 Drawing Sheets

REAL-TIME EQUIPMENT BEHAVIOR SELECTION

TECHNICAL FIELD

The subject specification relates generally to industrial control state machines and other modeled behaviors, and in particular to the application of multiple state machines to a hierarchy of objects and alteration of one or more of the state machines once implemented in an industrial control configuration.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, a state machine of an industrial control configuration can be hard-coded at development and thus be difficult to modify based on specific needs of an industry. A hierarchical layering can be created that enables details of a process to be evaluated and used. This hard-coding can become problematic as specific processes in their applicable industries can benefit from having state machines tailored to specific desired functionality. With specific tailoring, processes can run more efficiently, act appropriately regarding a particular industry, and the like.

With the disclosed innovation, a state machine can be modified, including one or more hierarchical rule sets of the state machine, as desired to allow for improved operation. A sequencing engine analyzes the hierarchical application of state machines and any proposed modifications and implements the modifications to the state machine. In addition, the modified state machines can be tested and modified in an attempt to ensure that the modification does not cause the state machines to fail. Moreover, security measures can be taken to protect the state machines, such that unauthorized modifications do not occur.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
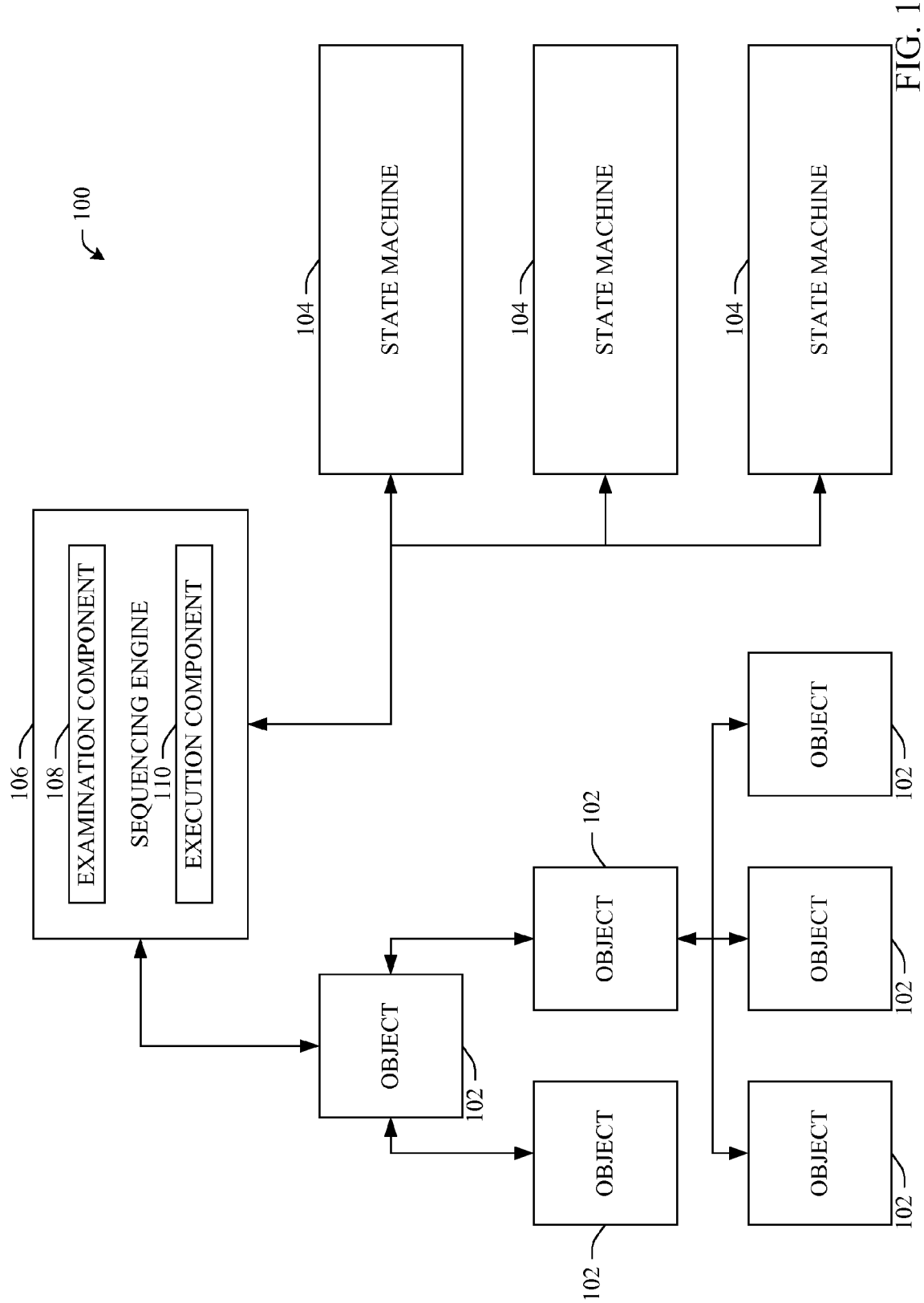
FIG. 1 illustrates a representative hierarchy of objects in conjunction with their state machine definitions and a sequencing engine in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example configuration 100 (e.g., portion of an industrial control configuration) is disclosed relating to executing a hierarchy of objects 102 through use of at least one state machine 104. Typically, an industrial control configuration can have multiple state machines 104 as well as multiple objects 102, where the objects 102 exist in a hierarchy. State machines 104 can be applied to the objects 104 in the hierarchy and the hierarchy can follow different state machines 104. According to one embodiment, objects are grouped by physical or/and behavioral hierarchies. While portions of the subject specification discuss operational control hierarchies, it is to be appreciated that other hierarchies can be used (e.g., cleanliness) and could conceptually follow a similar configuration and execution pattern. State machines 104 can be applied to a behavior aspect of an object 104 in the hierarchy and the hierarchy can follow different state machines 104. A sequencing engine 106 can execute the objects 102 down on the hierarchy to conform to a state machine 104 and what paths to take based upon the state machine 104. According to one embodiment, the state machines 104 can be industry standard state machines (e.g., third party tools).

The sequencing engine 106 can include an examination component 108 that analyzes hierarchy of objects 102 that conform to at least one state machine 104. The examination component 108 can operate as means for analyzing the hierarchy of objects through the access. In addition, an execution component 110 can be used that executes the objects in the hierarchy according to a hierarchical rule set based upon a result of the analysis. According to one embodiment, the objects 102 are distributed across a network (e.g., local network, remote network, etc.).

Figure 2:
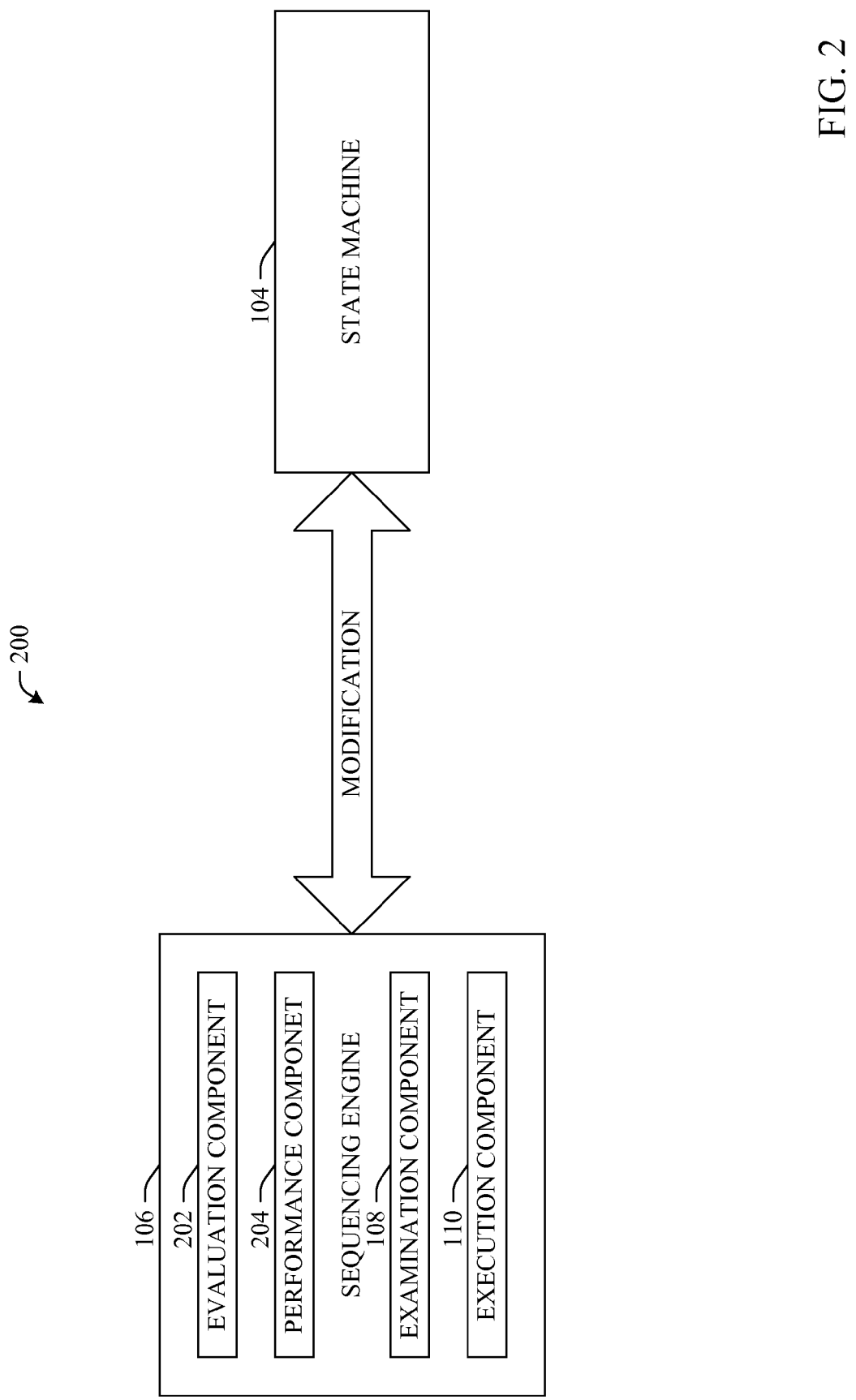
FIG. 2 illustrates a representative industrial control configuration with a state machine and a sequencing engine in accordance with an aspect of the subject specification.

Now referring to FIG. 2, an example system 200 is disclosed for modifying a state machine 104. A state machine 104 (e.g., S88 batch state machine) can be used in an industrial control configuration and can configure in a hierarchical manner such that different layers perform different details of a process. For example, a state machine can be used in a process for making ice cream. At a highest level, a general recipe can be used for ice cream creation. At lower levels, there can be smaller operations that are part of the ice cream making process, such as adding cream, mixing ingredients together, and the like. In addition, the state machine can include a number of hierarchical rule sets (e.g., rules) that dictate operation, such that different lower state combinations dictate how operation occurs at higher levels.

Conventionally, the state machine is hard coded at creation and shipped to a manufacturer such that changing hierarchical rule sets can be difficult if not impossible. For example, a conventional state machine can have a first level (e.g., general process) that is supported by a second level. At the second level there are two portions that can have different states—a 'run' state and an 'abort' state. When shipped, the state machine can have a hierarchical rule set that if either second level portion is at an 'abort', then the first level is automatically at 'abort'. However, it is possible that this implementation is not desirable for all industries. For instance, in the ice cream example, it can be possible that there is a desire to only have the first level 'abort' if both lower portions are at 'abort', such as in a packaging scenario where one 'abort' would lower packaging capacity to 50%, which can be considered better than 0%.

With the disclosed innovation, a sequencing engine 106 can be used to modify operation of the state machine 104. A change to a state machine hierarchical rule set can be collected and an evaluation component 202 can analyze the change (e.g., proposed change) to the hierarchical rule set of the state machine. Based upon the analysis (e.g., determining contents of the change), a performance component 204 can implement the change. Implementation of the change can be automatic (e.g., occur upon collecting the change) or upon determining if the change should take place (e.g., the change originates from an approved entity, the change is not likely to cause an error in the industrial control configuration, etc.). According to one embodiment, the state machine 104 is integrated in the industrial control configuration upon implementation of the change. However, it is to be appreciated that other execution can be practiced, such as a technician changing hierarchical rule sets upon the state machine at a manufacturing plant prior to implementation upon the configuration. The evaluation component 202 can function as means for evaluating a change to a hierarchical rule set of at least one state machine. The performance component 204 can operate as means for implementing the change.

Figure 3:
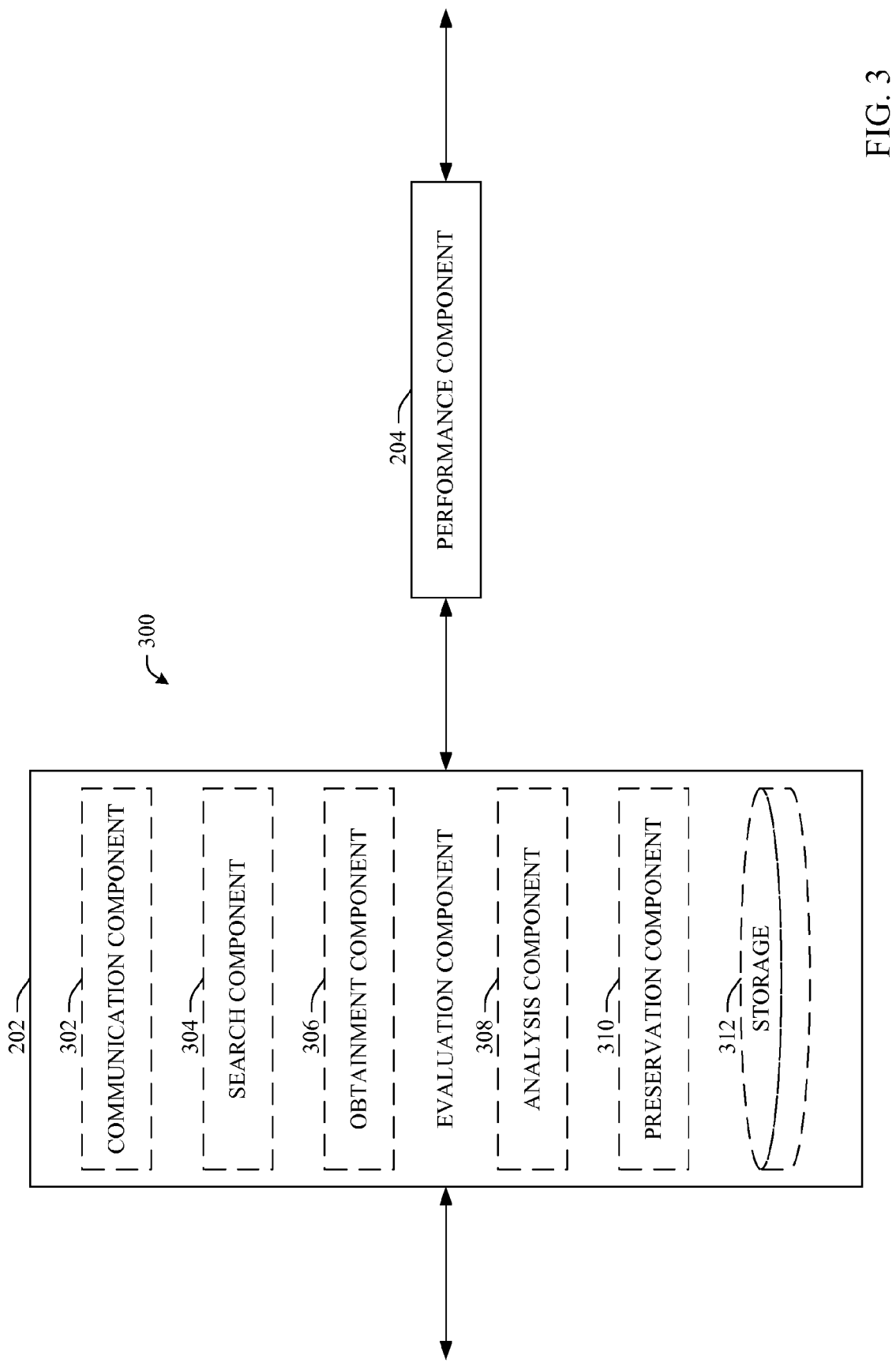
FIG. 3 illustrates a representative system for state machine modification with a detailed evaluation component in accordance with an aspect of the subject specification.

Now referring to FIG. 3, an example system 300 is disclosed for modifying a state machine, commonly while integrated upon an industrial control configuration. A change to a state machine can be analyzed by an evaluation component 202. To facilitate operation, the evaluation component 202 can use a communication component 302 that can engage with other devices to transfer information, such as to send a request for metadata, receiving metadata from an auxiliary source, etc. Operation can take place wirelessly, in a hardwired manner, employment of security technology (e.g., encryption), etc. Additionally, metadata transfer can be active (e.g., query/response) or passive (e.g., monitoring of public communication signals). Moreover, the communication component 302 can use various protective features, such as performing a virus scan on collected metadata and blocking metadata that is positive for a virus.

A search component 304 can discover information sources that are part of the configuration as well as auxiliary sources (e.g. a separate database). For instance, the search component 304 can discover possible sources of change instructions relating to hierarchical rule sets of the state machine. A technician can integrate a portable electronic device to the configuration and the search component 304 can discover that the device is integrated, evaluate the device, and determine that the device has potential to provide a change. According to one embodiment, reliable source metadata can be retained in storage. For example, if the device is removed from the configuration, the search component 304 can retain a record that the source is likely to return in case the device re-integrates. In addition, if it is determined that an added device is unlikely to produce information, then the search component 304 can delete relevant metadata to minimize storage space consumed.

Locations deemed relevant by the search component 304 as well as other locations can have information accessed by an obtainment component 306. The obtainment component 306 can gather information (e.g., access information) from various locations, including collecting an instruction for a change to a hierarchical rule set, determining a source of the instruction, collecting metadata related to the source (e.g., a person that sends an instruction), and the like. Filtering can be practiced, such that only information likely to be relevant is collected, information from more reliable sources is gathered first, a limited amount of data (e.g., based upon storage size) is collected, as well as other filtering types. The obtainment component 306 can operate as means for accessing a hierarchy of objects that conform to at least one state machine.

An analysis component 308 can be used to determine specific characteristics of the change. For example, the change can be that 'run-abort' in a lower level should change from signifying 'run' to signifying 'abort' in a higher level at a particular portion of a particular state machine. The analysis component 308 can determine a manner for implementing the change, appreciating what is intended by a change, employ the search component 304 to find the relevant state machine, evaluate the state machine to determine where the change should be made, and the like.

It is possible that changing operation of a state machine can cause an error in the state machine, an error in the configuration, an undesirable result (e.g., decreased efficiency), etc. Therefore, the evaluation component 202 can used a preservation component 310 that retains the hierarchical rule set of the state machine prior to implementing the change. Therefore, if after the change it is determined that the state machine should return to a pre-change status, a retained portion can be quickly access and used to bring the state machine back to a condition of desired operability. The preservation component 310 can retain the pre-state hierarchical rule set upon storage 312. In addition, the preservation component 310 can perform management techniques, such as keeping a most recent previous capture (e.g., since the most recent change) to minimize an amount of consumed storage 312.

Different pieces of information, such as collected metadata, component operating instructions (e.g., communication component 302), source location, components themselves, etc. can be held on storage 312. Storage 312 can arrange in a number of different configurations, including as random access memory, battery-backed memory, hard disk, magnetic tape, etc. Various features can be implemented upon storage 312, such as compression and automatic back up (e.g., use of a RAID configuration). In addition, storage 312 can operate as memory that can be operatively coupled to a processor (not shown).

Moreover, there can be a computer program embodied upon the storage 312 (e.g., a computer-readable medium) including program code for identifying a modification to a hierarchical rule set of an operational control state machine integrated with an industrial control configuration and program code for altering operation of a controller based upon the hierarchical rule set change. The storage 312 can be a removable entity, not integrate with the sequencing engine, be part of a distinct controller or other configuration entity, and the like. The system 300 can include a performance component 204 that implements the change.

Figure 4:
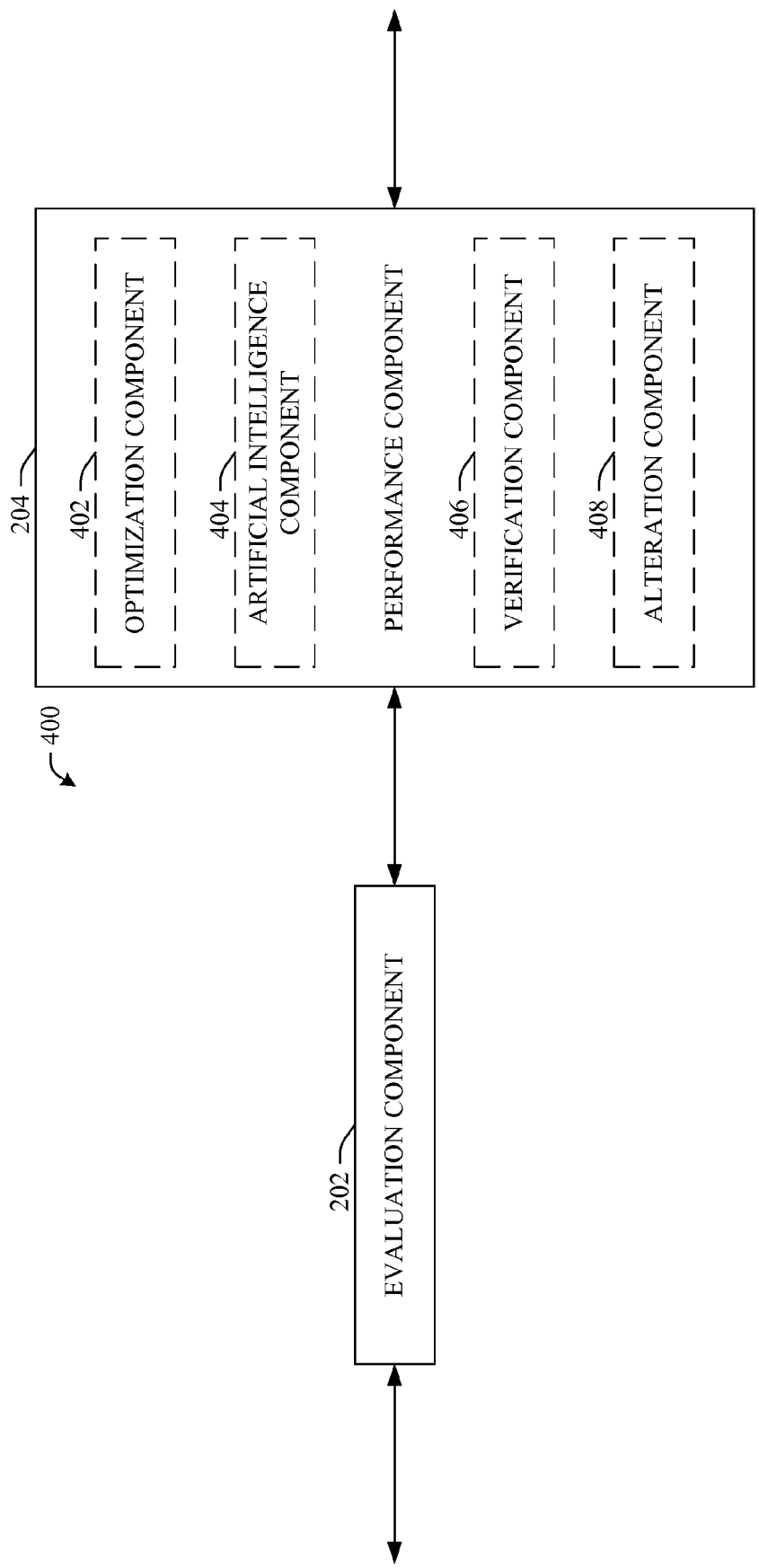
FIG. 4 illustrates a representative system for state machine modification with a detailed performance component in accordance with an aspect of the subject specification.

Now referring to FIG. 4, an example system 400 is disclosed for implanting a change to a state machine (e.g., change of a hierarchical rule set) for an industrial control configuration. The system 400 can use an evaluation component 202 that analyzes a change to a hierarchical rule set of a state machine. A performance component 204 can operate to implements the change.

The state machine can be configured such that it operates in an efficient manner (e.g., a most efficient manner). Therefore, an optimization component 402 can be used that improves operation of the industrial control configuration (e.g., improves operation of the state machine). For instance, a comparison can be made between the state machine before and after the change. If it is determined that the state machine is more efficient under an old configuration, then the optimization component 402 can automatically return the state machine (e.g., through used of the preservation component 310 of FIG. 3).

An artificial intelligence component 404 can be used to facilitate determinations of the system 400. It is to be appreciated that artificial intelligence techniques can be used to practice determinations and inferences disclosed in the subject specification. The artificial intelligence component 404 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 404 can also include methods for capture of logical relationships such as theorem provers or more heuristic rule-based expert systems. The artificial intelligence component 404 can be represented as an externally pluggable component, in some cases designed by a disparate (third) party.

The change can be enacted upon the state machine and a verification component 406 can test the implemented change to determine if the state machine is in error (e.g., complete failure/cannot operate, partial failure, functioning in an undesirable manner, etc.). According to one embodiment, the error can occur through incorrect implementation. However, errors can arise from other sources, such as malicious code (e.g., a change designed to cause an error), through a mistake made by a technician, and others.

To correct the error, the performance component 204 can employ an alteration component 408 that modifies the implemented change if it is determined that the state machine is in error. The alteration component 408 and/or verification component 406 can work in conjunction with the preservation component 310 of FIG. 3. For example, if the verification component 406 determines that the state machine is in error then the retained hierarchical rule set can be used by the alteration component 408 to modify the hierarchical rule set from the implemented change back to the retained hierarchical rule set. Other actions can be taken by the alteration component 408 to correct an error—for instance, if an error originated from a typographical error of a technician (e.g., typing 'abrt' as opposed to 'abort'), then the alteration component 408 can determine a likely spelling and perform an automatic correction. After a change by the alteration component 408, the verification component 406 and alteration component 408 can run again to ensure the correction does not cause an error. However, there can be some instances where the state machine cannot or should not be corrected. Therefore, an error message can be generated and transferred to an appropriate entity (e.g., a display component, a message inbox, and the like).

Figure 5:
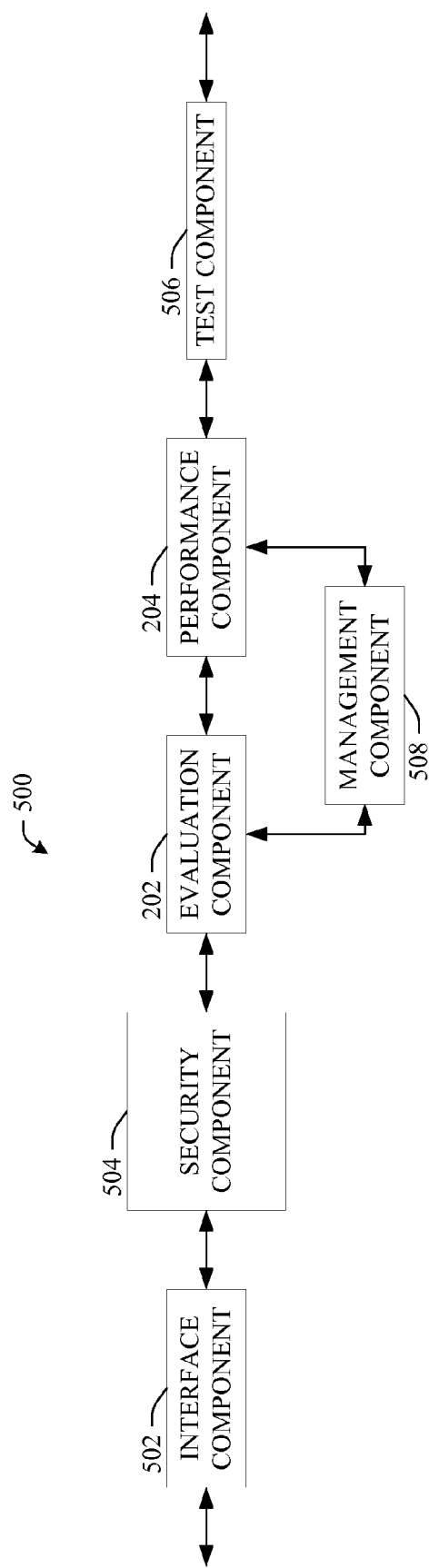
FIG. 5 illustrates a representative system for protecting a state machine in an industrial control configuration from improper modification in accordance with an aspect of the subject specification.

Now referring to FIG. 5, an example system 500 is disclosed for protecting a state machine regarding modification. A user can engage an interface component 502 to access information about a state machine or control configuration, enter information, propose a change, and the like. The interface component 502 can configure as a touch screen, a monitor-keyboard-mouse configuration, integrate with a personal electronic device (such as a cellular telephone), and the like. The interface component 502 can implement as means for collecting the proposed modification of the hierarchical rule set.

For a variety of reasons, it can be desirable to offer protection in relation to state machine modification. For example, an unauthorized person (e.g., repair technician) can attempt to modify the state machine and a security component 504 can be used to prevent implementation or mitigate impact of a proposed modification. In an illustrative example, a repair technician can attempt to make a change to the state machine and the security component 504 can block the request. A message can be sent from the security component 504 to a central administrator to determine if the change can be authorized and processed (e.g., evaluated and implemented). However, the security component 504 can function to merely block unauthorized attempts, ask for a password before an attempt can be processed, and the like.

There can be an evaluation component 202 that analyzes a change to a hierarchical rule set of a state machine. Therefore, the evaluation component 202 can function as means for determining if a proposed modification to a state machine should take place as a function of a result of analysis of the proposed modification. The evaluation component 202 can use the security component 504 to be based upon based upon security of the state machine. In addition, the system 500 can use a performance component 204 that implements the change, thus functioning as means for executing the proposed modification. According to one embodiment, the state machine is part of the industrial control configuration upon collecting the proposed modification.

The evaluation component 202 can use a test component 506 to predict how the state machine and industrial control configuration can act with the implemented change. In addition, the change can be implemented by the performance component 204 and then the test component 506 can operate to determine if the state machine is in error (e.g., before bringing the state machine online). The test component 506 can be used by the evaluation component to base operation upon applicability of the proposed modification such that the proposed modification would cause the state machine to be in error. Additionally, the system 500 can use a management component 508 that takes the at least one state machine offline prior to implementing a change and brings the at least one state machine back online once it is determined that the at least one state machine is not in error (e.g., based on a result of the test component 506, based upon an assumption, etc.).

Figure 6:
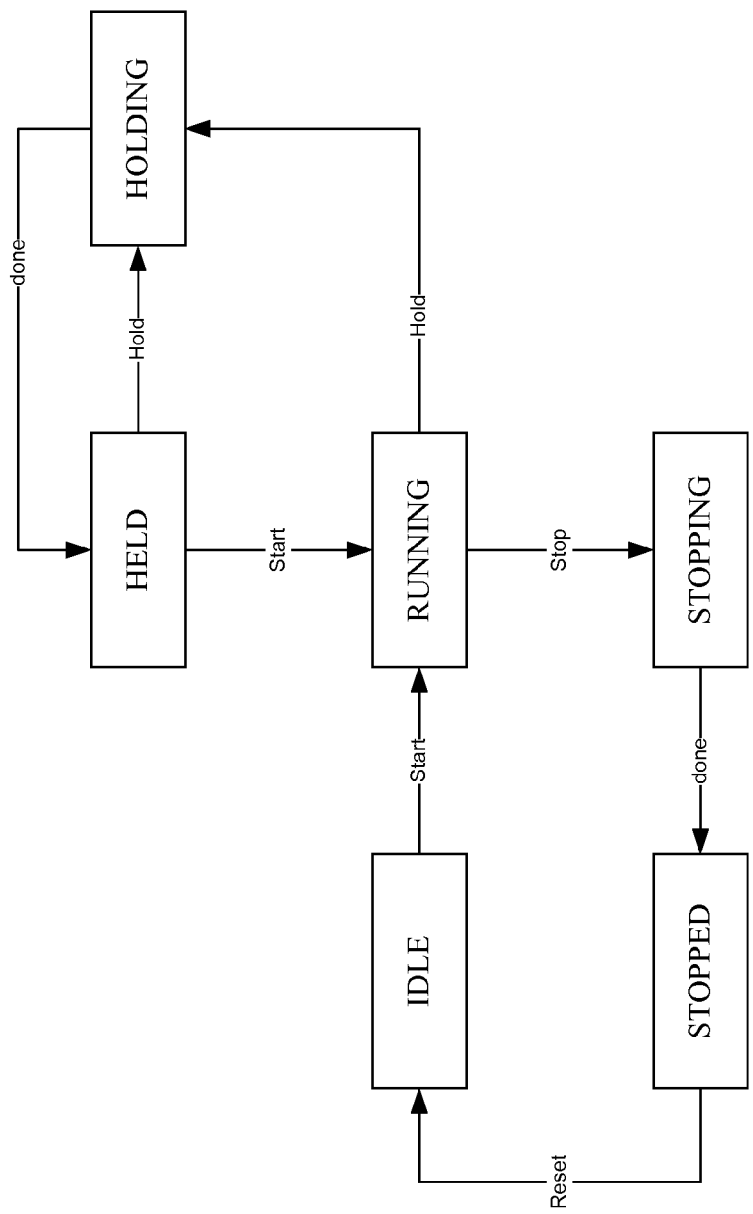
FIG. 6 illustrates a representative state machine that can be used in conjunction with an industrial control configuration in accordance with an aspect of the subject specification.

Now referring to FIG. 6, an example of a simple state machine 104 is disclosed that can be used in accordance with aspects disclosed herein. A number of different layers can exist in the state machine and be used to control at least different portions of an industrial control process. Different functionality can implement the state machine with specific characteristics and hierarchical rule sets. For example, while operating the state machine 104 can be in 'running' condition. Two alternatives can take place, either a 'hold' (e.g., temporarily suspend, pause, etc.) or a 'stop'. In an illustrative instance, when making ice cream the state machine 104 can control adding cream into a mixing bowl. Until a proper amount of cream is added, the state machine can function in a 'running' condition. If an error occurs, the state machine 104 can change to a 'hold' until the error is fixed and then move to 'running' so operation can occur again. However, when finished, the state machine 104 can transfer a done command such that the state machine is in a 'hold'. The state machine 104 can be a portion of a larger configuration (e.g., large state machine) that uses the 'idle' designation to show that other operations should take place (e.g., when cream is done being added, the state machine shows 'idle' and mixing should occur). In a similar fashion, state machines with specific characteristics and hierarchical rule sets modeling other behavioral aspects besides the operational state of equipment can be defined and executed.

Figure 7:
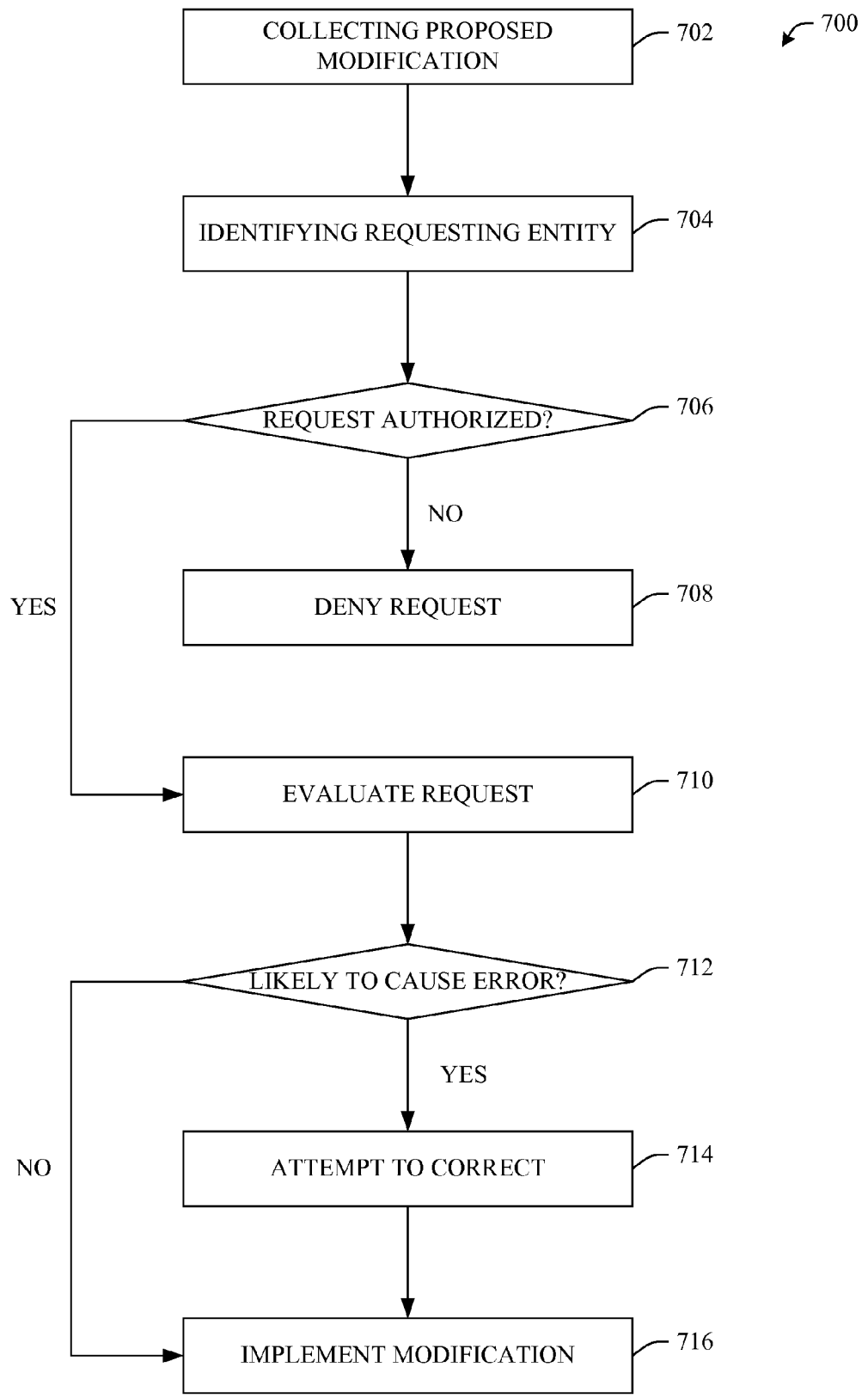
FIG. 7 illustrates a representative methodology for performing verification in relating to modifying a state machine in accordance with an aspect of the subject specification.

Now referring to FIG. 7, an example methodology 700 is disclosed for processing a proposed change to a state machine. A request to modify a state machine (e.g., hierarchical rule set of a state machine) can be collected at action 702, thus operating as collecting the proposed modification of the hierarchical rule set. In one implementation, the state machine is part of an industrial control configuration upon collecting the proposed modification.

A requesting entity (e.g., a user, an automatic operating device, etc.) can be identified at event 704 as well as other information related to the request. For example, an automatic diagnostics tool can determine that the state machine is operating in an inefficient manner, evaluate the state machine, and suggest modifications. There can be identification of the device, analysis of when the device made the request, and the like. Event 704 can include identifying if an entity requesting to make a proposed modification is allowed to make the modification.

A check 706 can be performed to determine if the request is authorized. The check can compare a source of the request (e.g., Internet Protocol address of an origin device) against a list of authorized sources. In a more complex example, a determination can be made based upon the source, time the request is made, historical characteristics, contextual metadata (e.g., if the control configuration is considered to be in a vulnerable state, then higher scrutiny can be applied). Check 706 can include determining if the proposed modification should take place as a function of a result of analysis, where the determination is based upon security of the state machine. If it is determined that the request is not authorized, then the request can be denied at act 708.

However, if it is determined that the request is authorized, then the request can be evaluated to determine how the request implements with the state machine at action 710. Action 710 can function as analyzing a proposed modification to a hierarchical rule set of a state machine. When determining if a request is authorized, it is possible that merits of the request are not considered. However, even an authorized request can be problematic, such as causing a non-ending loop. A determination can be made at check 712 on if a proposed modification of the request is likely to cause an error. Check 712 can function for determining if the proposed modification should take place as a function of a result of the analysis, where the determination is based upon applicability of the proposed modification such that the proposed modification would cause the state machine to be in error.

According to one embodiment, a virtual control configuration can be used to test and predict how the modification influences other elements. If an error is deemed likely to occur, then the methodology 700 can attempt to correct the error at action 714. Action 714 can include analyzing the proposed modification to the hierarchical rule set of the state machine includes testing the proposed modification to anticipate if implementation of the proposed modification causes the state machine to be in error. If an error is not likely or the correction is made, then the modification can be implemented at event 716. However, it is to be appreciated the modification can be enacted and observations made if an error actually occurs—if an error occurs then a correction attempt can be made.

Figure 8:
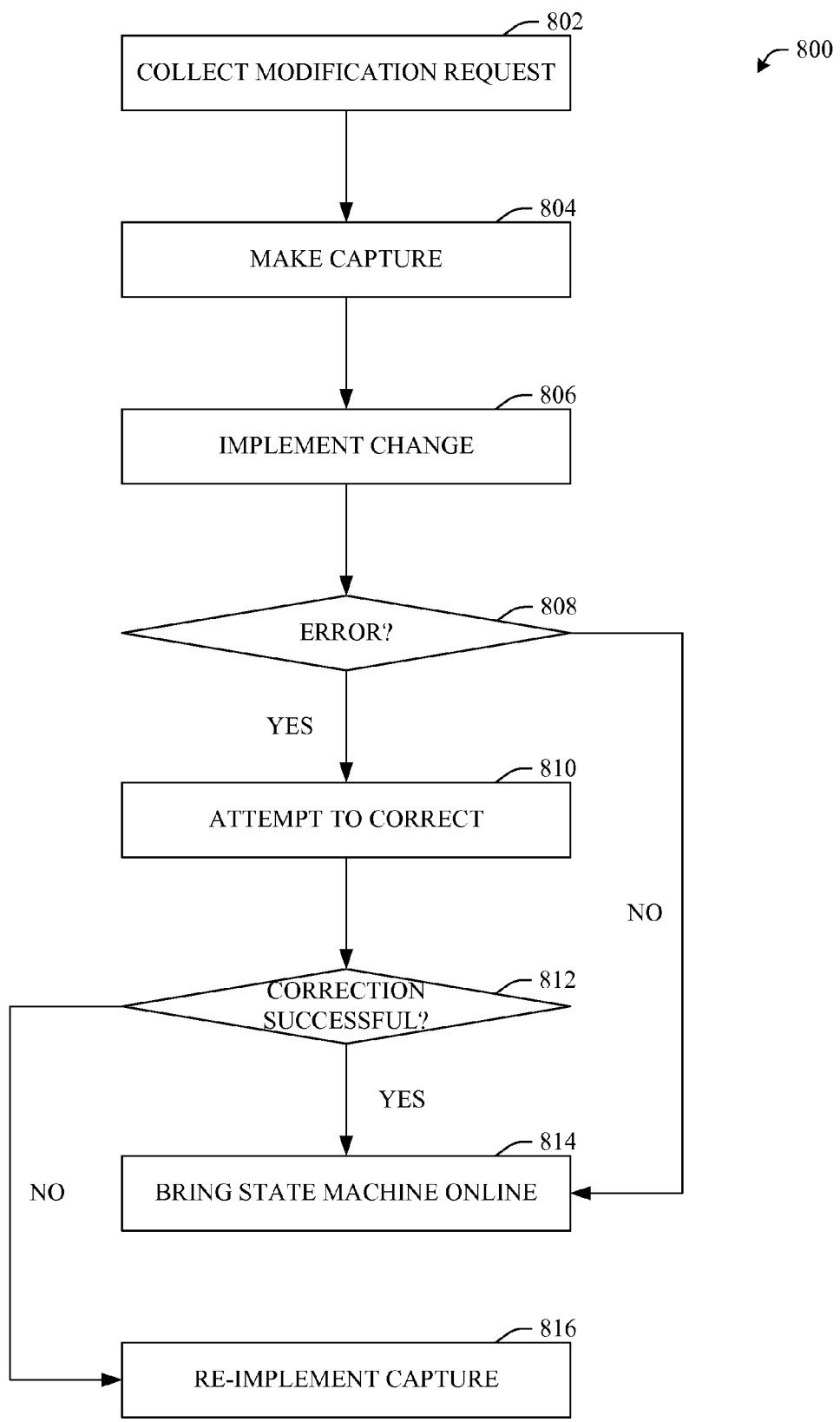
FIG. 8 illustrates a representative methodology for implementing protective features concerning modification of a state machine in accordance with an aspect of the subject specification.

Now referring to FIG. 8, an example methodology 800 is disclosed for using protective measures in regard to changing a state machine, commonly of an industrial control configuration. A modification request can be collected at act 802. At the time of the collection, a capture can be made of the state machine at action 804. The capture can be a recording of at least part of how the state machine configures. The capture can retain a large amount of information relate to the state machine or just portions relevant to the modification portion (e.g., the portion that is impacted by the modification).

A determination can be made on if the capture is correctly taken—if there is a correctly taken capture, then the change can be implemented at event 806. If it is determined that the capture is not correct (e.g., there is any error, there is a substantial error, etc.), then another capture can be taken, the request can be denied, and the like. A check 808 can take place to determine if the state machine causes an error. This can be an actual error (e.g., determined through observation) as well as an anticipated error (e.g., determined through testing).

If it is determined that there is an error, then the error can be identified and there can be an attempt to correct the error at act 810. After the error is corrected, a check 812 can take place to determine if the correction is successful. If the correction is successful or an error is not determined at the check 808, then the state machine can be brought online so that the industrial control configuration can use the state machine. However, if the correction is not successful, then the capture can be re-implemented at action 816 (e.g., modified hierarchical rule sets can be replaced with former hierarchical rule sets). It is to be appreciated that act 810 can be repeated multiple times before re-implementing the capture in order to attempt to correct the error.

Figure 9:
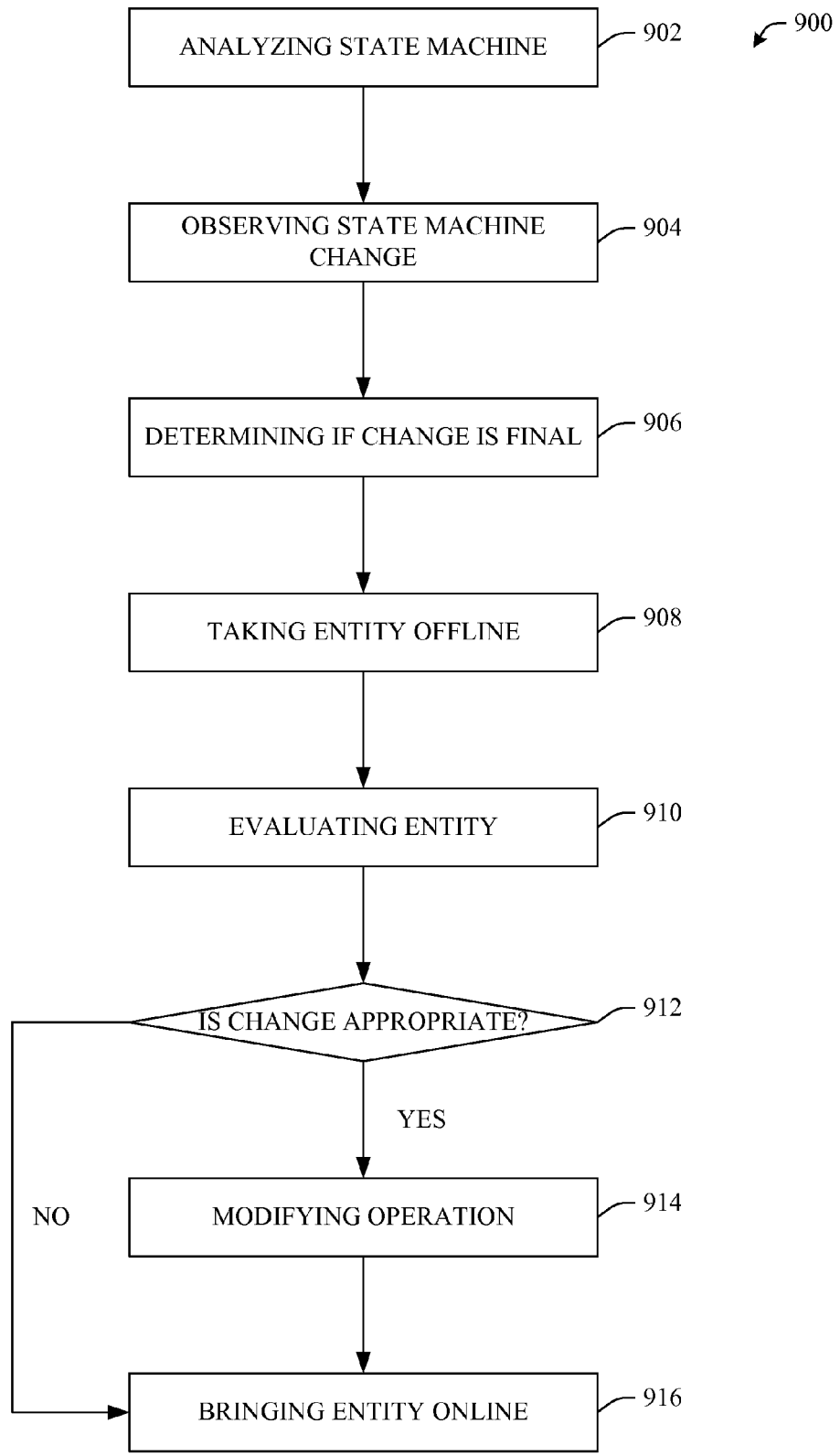
FIG. 9 illustrates a representative methodology relating to operation of a supplemental device in conjunction with modification of a state machine in accordance with an aspect of the subject specification.

Now referring to FIG. 9, an example methodology 900 is disclosed for operating an entity (e.g., controller) that operates in conjunction with a state machine. A state machine can be analyzed at event 902 (e.g., hierarchical rule sets of the state machine can be determined). This can occur upon the state machine entering an industrial control configuration, upon the entity entering the configuration, and the like.

The state machine can be subjected to a change and this change can be observed by the entity at action 904. Commonly the change is to a hierarchical rule set of the state machine, but it is to be appreciated that other changes are possible. A determination can be made at act 906 if the change to the state machine is considered final. For example, the state machine can be modified, but testing is not complete and thus the change is not considered final. However, brining the state machine online can be considered a sign of finality of a change.

The entity can be taken offline at event 908 to modify operation based upon the change to the state machine. Taking the state machine offline can assist in protect other entities from relying on incorrect data while change occurs. In addition, metadata relevant to the state machine can be collected, such as what hierarchical rule set is changed, why the change is made, how frequently information is changed, and the like. The entity can be evaluated through action 910 to assist in determining changes that are appropriate.

A check 912 can determine if a change to the entity is appropriate based upon modification of the state machine. For example, in an initial configuration if the state machine is at 'abort', then the entity can stop operating. However, if the state machine changes such that when a portion is at 'abort' other operations occur, then it can be detrimental for the entity to stop operation.

If it is determined that change is appropriate at check 912, then a manner for modifying operation of the entity can be determined and a change can take place accordingly. The change can be tested (and corrected if appropriate) and the entity can be brought back online at act 916. Additionally, if change is not appropriate, then the entity can be automatically brought back online. According to an alternative embodiment, then entity is taken offline only if it is determined that a change is appropriate.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
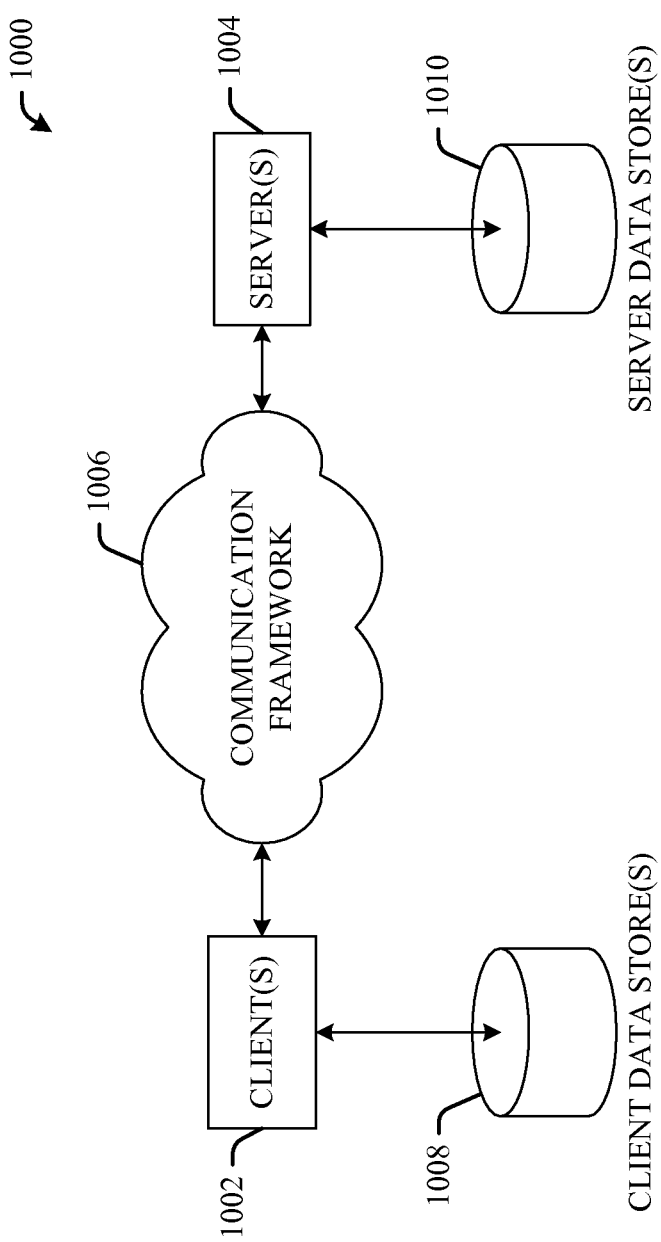
FIG. 10 illustrates an example of a schematic block diagram of a computing environment in accordance with an aspect subject specification.
Figure 11:
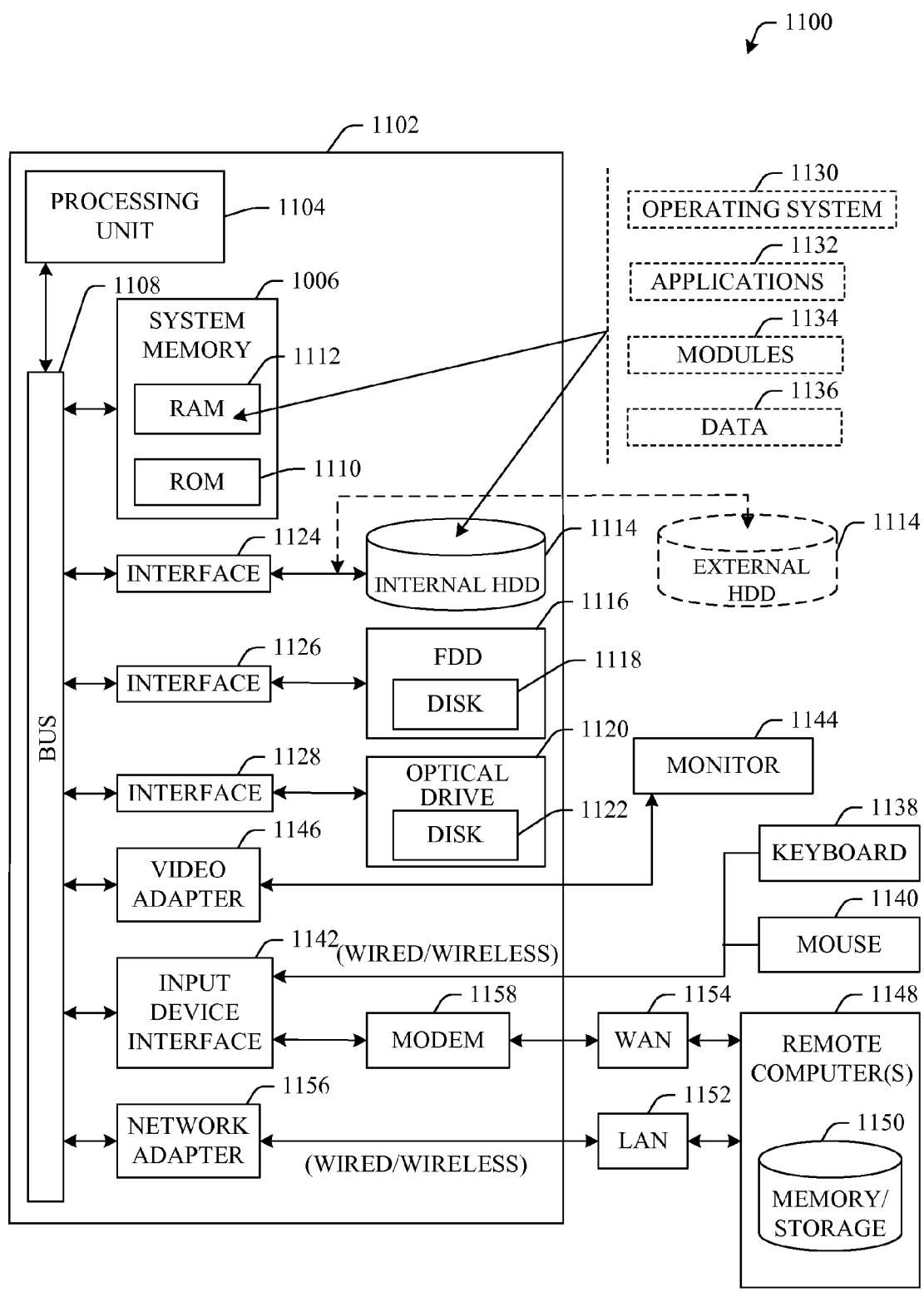
FIG. 11 illustrates an example of a block diagram of a computer operable to execute the disclosed architecture.

In order to provide a context for the various aspects of the disclosed subject matter, FIGS. 10 and 11 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors or proprietary specific configured processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various proprietary or commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
an analysis component configured to determine a characteristic of a change in a rule set for operation of a state machine;
a communication component configured to collect metadata from at least one object conforming to the state machine based on the characteristic of the change in the rule set for the operation of the state machine; and
a performance component configured to implement the change in the rule set for the operation of the state machine based on the metadata.

2. The system of claim 1, further comprising:
a security component configured to authenticate a user to change the rule set for the operation of the state machine,
wherein the performance component is configured to implement the change in response to authentication of the user.

3. The system of claim 1, wherein a plurality of objects associated with the hierarchy of objects are distributed across a network.

4. The system of claim 1, further comprising:
a verification component configured to detect an error in the state machine based on the change in the rule set for the operation of the state machine; and
an alteration component configured to modify the change in the rule set for the operation of the state machine based on the error.

5. The system of claim 4, further comprising a preservation component configured to retain a configuration of the state machine prior to the implementation of the change in the rule set for the operation of the state machine, wherein the alteration component is configured to modify the change in the rule set for the operation of the state machine based on the configuration.

6. The system of claim 1, further comprising a management component configured to take the state machine offline prior to implementing the change in the rule set for the operation of the state machine.

7. The system of claim 1, wherein the state machine is configured according to an industrial process.

8. A method, comprising:
determining, by a system including a processor, a characteristic of a change in a rule set for operation of a state machine;
collecting metadata from an object conforming to the state machine based on the characteristic of the change in the rule set for the operation of the state machine; and
implementing the change the rule set for the operation of the state machine based on the metadata.

9. The method of claim 8, wherein the analyzing further comprises determining an applicability of the change to the rule set for the operation of the state machine to an error of the state machine.

10. The method of claim 8, wherein the analyzing further comprises testing the change to the rule set for the operation of the state machine anticipate that implementation of the change to the rule set for the operation of the state machine causes the state machine to be in error.

11. The method of claim 8, wherein the analyzing further comprises determining a security of the state machine.

12. A computer-readable storage medium having computer-executable instructions stored thereon that, in response to execution, cause a device including a processor to perform operations, comprising:
determining a characteristic of a change in a rule set for the operation of a state machine;
collecting metadata from an object conforming to the state machine based on the characteristic of the change in the rule set for the operation of the state machine; and
implementing the change the rule set for the operation of the state machine based on the metadata.

13. An industrial controller, comprising:
at least one memory that stores computer-executable instructions; and
at least one processor, communicatively coupled to the at least one memory, that facilitates execution of the computer-executable instructions to at least:
determine a set of characteristics of a change in a rule set for operation of a state machine;
collect metadata from objects conforming to the state machine based on the set of characteristics of the change in the rule set for the operation of the state machine; and
implement the change to the rule set for the operation of the state machine based on the set of characteristics.

14. The industrial controller of claim 13, wherein the at least one processor further facilitates the execution of the computer-executable instructions to at least:
authenticate a user to change the rule; and
implement the change to the rule set for the operation of the state machine after authentication of the user.

15. The industrial controller of claim 13, wherein the plurality of objects are distributed across the network.

16. The industrial controller of claim 13, wherein the at least one processor further facilitates the execution of the computer-executable instructions to at least:
detect an error in the state machine based on the change to the rule set for the operation of the state machine; and
modify the change based on the error.

17. The industrial controller of claim 13, wherein the state machine is configured according to an industrial process.

18. The system of claim 1, further comprising an execution component configured to execute, based on the change in operation of the state machine, a plurality of objects arranged in a hierarchy by the state machine based on the change in the rule set for the operation of the state machine.

19. The system of claim 1, further comprising:
a search component configured to discover a source for the change in the rule set for the operation of the state machine; and
an obtainment component configured to facilitate access to the source to receive the change in the rule set for the operation of the state machine.

20. The system of claim 1, further comprising an examination component configured to analyze a hierarchy of objects that conform to the state machine based on the change in the rule set for the operation of the state machine.

\* \* \* \* \*